(12) United States Patent
Clancy

(10) Patent No.: US 12,010,111 B2
(45) Date of Patent: Jun. 11, 2024

(54) PROVIDING CREDENTIALS FROM WEB HOSTED APPLICATION TO A NETWORK DEVICE ON A LOCAL NETWORK

(71) Applicant: ARRIS Enterprises LLC, Suwanee, GA (US)

(72) Inventor: Paul A. Clancy, Duluth, GA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 176 days.

(21) Appl. No.: 17/511,896

(22) Filed: Oct. 27, 2021

(65) Prior Publication Data

US 2022/0150234 A1 May 12, 2022

Related U.S. Application Data

(60) Provisional application No. 63/112,715, filed on Nov. 12, 2020.

(51) Int. Cl.
*H04L 29/06* (2006.01)
*H04L 9/40* (2022.01)
*H04W 12/06* (2021.01)
*H04W 12/086* (2021.01)
*H04L 67/02* (2022.01)

(52) U.S. Cl.
CPC ......... *H04L 63/083* (2013.01); *H04W 12/068* (2021.01); *H04W 12/086* (2021.01); *H04L 67/02* (2013.01)

(58) Field of Classification Search
CPC ....... H04L 63/083; H04L 67/02; H04L 41/22; H04L 63/0884; H04L 63/0807; H04W 12/068; H04W 12/086; G06F 16/955; G06F 21/335; G06F 21/34
See application file for complete search history.

(56) References Cited

U.S. PATENT DOCUMENTS 9,059,987 B1 * 6/2015 Lofland ............... H04L 63/0815
9,075,950 B2 * 7/2015 Zhu ......................... G06F 30/17
(Continued)

OTHER PUBLICATIONS

International Search Report and the Written Opinion of the International Searching Authority dated Apr. 4, 2022 in International (PCT) Application No. PCT/US2021/056796.
(Continued)

*Primary Examiner* — Khalid M Almaghayreh
(74) *Attorney, Agent, or Firm* — Wenderoth, Lind & Ponack, L.L.P.

(57) ABSTRACT

A server application can serve a web application to a client device as a client web application from a web application host. The server application can be a secure HTTPS website. The web application on the client device can provide a token over a local network using a HTTP request to a target device on the local network. The token is associated with a secure area of a remote repository. Having received the one or more tokens, the target device can indicate that a link has been established to the secure area by writing to or reading from the secure area as the server application informs the client web application executing in a browser at a client device of the read/write. The target device and client web application can then communicate via the secure area, for example, to store or retrieve data associated with a user.

17 Claims, 9 Drawing Sheets

(56) References Cited

U.S. PATENT DOCUMENTS

| | | | | |
|---|---|---|---|---|
| 9,900,305 | B2* | 2/2018 | Levergood | G06Q 30/06 |
| 10,148,495 | B1* | 12/2018 | Oczkowski | H04W 8/20 |
| 10,949,507 | B2* | 3/2021 | Morris | H04L 67/025 |
| 2006/0020684 | A1* | 1/2006 | Mukherjee | H04L 67/561 |
| | | | | 709/219 |
| 2012/0203639 | A1* | 8/2012 | Webster | H04L 67/306 |
| | | | | 705/14.66 |
| 2014/0181916 | A1* | 6/2014 | Koo | H04W 8/22 |
| | | | | 726/4 |
| 2015/0373148 | A1* | 12/2015 | He | G06F 9/452 |
| | | | | 709/203 |
| 2016/0315856 | A1* | 10/2016 | Tewari | H04L 67/52 |
| 2016/0359846 | A1* | 12/2016 | Yoshimuta | H04L 63/0807 |
| 2018/0007033 | A1* | 1/2018 | Ajitomi | H04L 63/061 |
| 2018/0260493 | A1* | 9/2018 | Nakashima | H04L 63/10 |
| 2019/0007311 | A1* | 1/2019 | Omar | H04L 45/586 |
| 2020/0201980 | A1* | 6/2020 | Madina | G06F 16/972 |
| 2020/0382401 | A1* | 12/2020 | Rudnik | H04W 76/12 |
| 2021/0373932 | A1* | 12/2021 | Cook | H04L 67/02 |

OTHER PUBLICATIONS

International Preliminary Report on Patentability and Written Opinion dated May 25, 2023 in International Application No. PCT/US2021/056796.

Bemers-Lee et al., "Uniform Resource Locators (URL)," University of Minnesota, Network Working Group, Request for Comments: 1738, Dec. 1994, 26 pages.

* cited by examiner

PROVIDING CREDENTIALS FROM WEB HOSTED APPLICATION TO A NETWORK DEVICE ON A LOCAL NETWORK

BACKGROUND

Companies are increasingly providing Multiple Access Point (MAP) architecture or Home Network Controller (HNC) type of home wireless fidelity (Wi-Fi) management, with multiple access point devices and/or extender access point devices (collectively, network devices) within the home to improve Quality of Experience (QoE) of the user by offering extended coverage with seamless roaming.

Increasingly applications that are served from a website, for example, web applications also referred to as web apps, are being used instead of native applications. To the user of a client device, such as a smart phone or tablet, the web app typically has an appearance and features very similar to a native application. For example, a web app can also be stored locally on the client device for use when the client device is not connected to the Internet/network. The web app provides flexibility or portability over a native application as the web app, for example, can be operational across different platforms. However, the web app must execute or run in a browser environment, which in turn forces additional restrictions. One such restriction is the inability to open arbitrary communications with other network or client devices within a network. For example, a web app that was originated from a hypertext protocol secure (HTTPS) webpage, a web browser only allows HTTPS communication with other network devices. Thus, there is a need to provide a more robust web served interface of the network device so as to provide secure access to various features or functionality of a web app to enhance the experience for each user of the network without affecting security.

SUMMARY

Network environments, especially home network environments, can now serve multiple functions for various types of users, network devices, network applications, etc. For example, the same network can be required to support a variety of users and network devices that seek to access various aspects of the network environment, for example, various features and functionality at various network devices. These various aspects of the network devices can include utilizing web apps which can control one or more types of communications, such as restricting communications to only HTTPS. For example, a web application executing in a web browser of a target device may need to access, such as read from or store data to, a network resource. The network resource often requires a token before allowing access to ensure security of the data. The token can comprise one or more credentials, such as a username and/or password, a privilege parameter, a user group parameter, any other token or credential, and any combination thereof. Access can be controlled by a token receiver. For example, a token receiver running or executing on a target device can analyze any received token so as to provide access to one or more features or functionality associated with the target device, such as those provided by a web application (also referred to as a web app). Denying access to such features or functionality of the target device prevents a user from controlling, altering, or modifying an aspect of the network environment that may be necessary for the proper operation of, for example, a web app.

For example, a user attempting to access the user's area at a network resource (for example, a gaming resource) associated with a streaming video game of a gaming system may experience latency that affects the user's ability to effectively interact with or participate in the streaming video game. According to one or more novel solutions provided herein, a user can access data, information, applications, etc. at a secure area of a network resource by obtaining a token via a web application running in a web browser at a client device. A web application, for example, a JavaScript™ application, running in a web browser, can be served from an HTTPS website with access to a network resource, such as a cloud-based database. A user utilizing a client device can create an account at the network resource, for example, using a username, password, or both. The network resource provides a token for future access to a secure area at the network resource, for example, for use with a gaming system for playing a streamed video game. This token is required by any network device seeking access to the secure area at the network resource, for example, the target device. The client device can communicate the token to the target device, for example, an access point device, such that the target device can access the secure area, such as a user area associated with a user, of the network resource so as to provide any information or data associated with the secure area to the gaming system associated with the user. A target device within the network is then also available via the network resource such that a user can change, alter or modify a feature or functionality associated with the target device, for example, when the target device is a remotely controllable network device, such as thermostat. Additionally, the target device that has the proper token can access a secure area to write data to the secure area of the network resource.

The network resource can provide one or more tokens for accessing the cloud-based database over a local network to the client device using a HTTPS webserver. Providing a HTTPS server on a local target device has more complexity than providing an HTTP server. Web browsers are sensitive to changes in protocol, for example, changes from HTTPS requests to HTTP requests are blocked. According to one or more novel solutions, the target device can obtain a token associated with a secure area of the network resource and use that token to enable secure communication between the target device and a client device via the network resource.

An aspect of the present disclosure provides a target device of a network for accessing a secure area of a remote repository. The target device comprises a memory storing one or more computer-readable instructions and a processor. The processor is configured to execute the one or more computer-readable instructions to receive a request from a client web application running in a web browser of a client device to access an HTTP uniform resource locator (URL) associated with the target device, wherein the request comprises a token associated with the secure area, store the token, create a link to the remote repository based on the token, and access the secure area based on the link.

In an aspect of the present disclosure, the processor is further configured to execute the one or more instructions to send an HTTP response to the web browser of the client device based on the request.

In an aspect of the present disclosure, the HTTP response comprises a web page.

In an aspect of the present disclosure, the creating the link to the remote repository comprises writing to the secure area based on the token.

In an aspect of the present disclosure, the target device is an access point device.

In an aspect of the present disclosure, creating the link to the remote repository comprises receiving a notification from the server application directed to the client web application, and providing the notification to the client web application, wherein the notification indicates to the client web application that the web page can be closed.

In an aspect of the present disclosure, the token comprises a username and a password associated with the username.

An aspect of the present disclosure provides a method for a target device to access a secure area of a remote repository. The method comprises receiving a request from a client web application running in a web browser of a client device to access an HTTP URL associated with the target device, wherein the request comprises a token associated with the secure area, storing the token, creating a link to the remote repository based on the token, and accessing the secure area based on the link.

In an aspect of the present disclosure, the method further comprising sending an HTTP response to the web browser of the client device based on the request.

In an aspect of the present disclosure, the method such that the HTTP response comprises a web page.

In an aspect of the present disclosure, the method is such that queueing the request based on the throttling factor comprises bumping the request by a factor indicated by the throttling factor.

In an aspect of the present disclosure, the method such that creating the link to the remote repository comprises writing to the secure area based on the token.

In an aspect of the present disclosure, the method such that the target device is an access point device.

In an aspect of the present disclosure, creating the link to the remote repository comprises receiving a notification from the server application directed to the client web application and providing the notification to the client web application, wherein the notification indicates to the client web application that the web page can be closed.

In an aspect of the present disclosure, the method is such that the token comprises a username and a password associated with the username.

An aspect of the present disclosure provides a non-transitory computer-readable medium of an of a target device storing one or more instructions for accessing a secure area of a remote repository. The one or more instructions when executed by a processor of the target device cause the target device to perform one or more operations including the steps of the method described above.

An aspect of the present disclosure provides a method for a client web application running in a web browser to provide a target device access to a secure area of a remote repository. The method comprises presenting a registration browser window in a web browser, wherein the registration browser window comprises a web page link to a new browser window, encoding a token in a query parameter, wherein the token is associated with a secure area of a repository, requesting to open the new browser window in the web browser at a URL address associated with the target device based on a selection of the web page link, wherein the URL address comprises the query parameter, and receiving a link status associated with the request, wherein the link status is indicative of a link between the target device and the remote repository, request to open the new browser window in the web browser at a URL address associated with the target device based on a selection of the web page link, wherein the URL address comprises the query parameter, and receiving a link status associated with the request, wherein the link status is indicative of a link between the target device and the remote repository.

In an aspect of the present disclosure, the method is such that the link status indicates that the link between target device and the remote repository has been established.

In an aspect of the present disclosure, the method further comprises closing the new browser window based on the link status.

In an aspect of the present disclosure, the method further comprises receiving a login input at a login URL, wherein sending the request is based on the login input.

In an aspect of the present disclosure, wherein the login URL comprises a hypertext transfer protocol secure (HTTPS) address associated with a server application, wherein the secure area is associated with the server application.

In an aspect of the present disclosure, the method further comprises launching a registration browser window based on the login input, wherein the registration browser window comprises a web page link to the new browser window, receiving a registration input associated with the web page link, wherein the registration input indicates activation of the web page link, and wherein the request is based on the registration input.

In an aspect of the present disclosure, the method further comprises receiving an internet protocol (IP) address of the target device, wherein the request is based on the IP address.

An aspect of the present disclosure provides a client device for providing a client web application running in a web browser to provide a target device access to a secure area of a remote repository. The client device comprises a memory storing one or more computer-readable instructions and a processor configured to execute the one or more computer-readable instructions to present a registration browser window in a web browser, wherein the registration browser window comprises a web page link to a new browser window, encode a token in a query parameter, wherein the token is associated with a secure area of a repository, send a request to open the new browser window in the web browser at a uniform resource locator (URL) address associated with the target device based on a selection of the web page link, wherein the URL address comprises the query parameter, and receive a link status associated with the request, wherein the link status is indicative of a link between the target device and the remote repository.

In an aspect of the present disclosure, the link status indicates that the link between the target device and the remote repository has been established.

In an aspect of the present disclosure, the processor is further configured to execute the one or more instructions to close the new browser window based on the link status.

In an aspect of the present disclosure, the processor is further configured to execute the one or more instructions to receive a login input at a login URL, wherein sending the request is based on the login input.

In aspect of the present disclosure, the login URL comprises a hypertext transfer protocol secure (HTTPS) address associated with a server application, wherein the secure area is associated with the server application.

In an aspect of the present disclosure, the processor is further configured to execute the one or more instructions to launch a registration browser window based on the login input, wherein the registration browser window comprises a web page link to the new browser window, receive a registration input associated with the web page link, wherein the registration input indicates activation of the web page link, and wherein the request is based on the registration input.

In an aspect of the present disclosure, the processor is further configured to execute the one or more instructions to receive an IP address of the target device, wherein the request is based on the IP address.

An aspect of the present disclosure provides a non-transitory computer-readable medium of a client device storing one or more instructions for providing a client web application running in a web browser to provide a target device access to a secure area of a remote repository. The one or more instructions when executed by a processor of the client device, cause the client device to perform one or more operations of the method discussed above.

Thus, according to various aspects of the present disclosure described herein, it is possible to provide access to a secure area of a repository that is remote from a target device. Providing access to the target device to the user area allows for an enhanced QoE.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
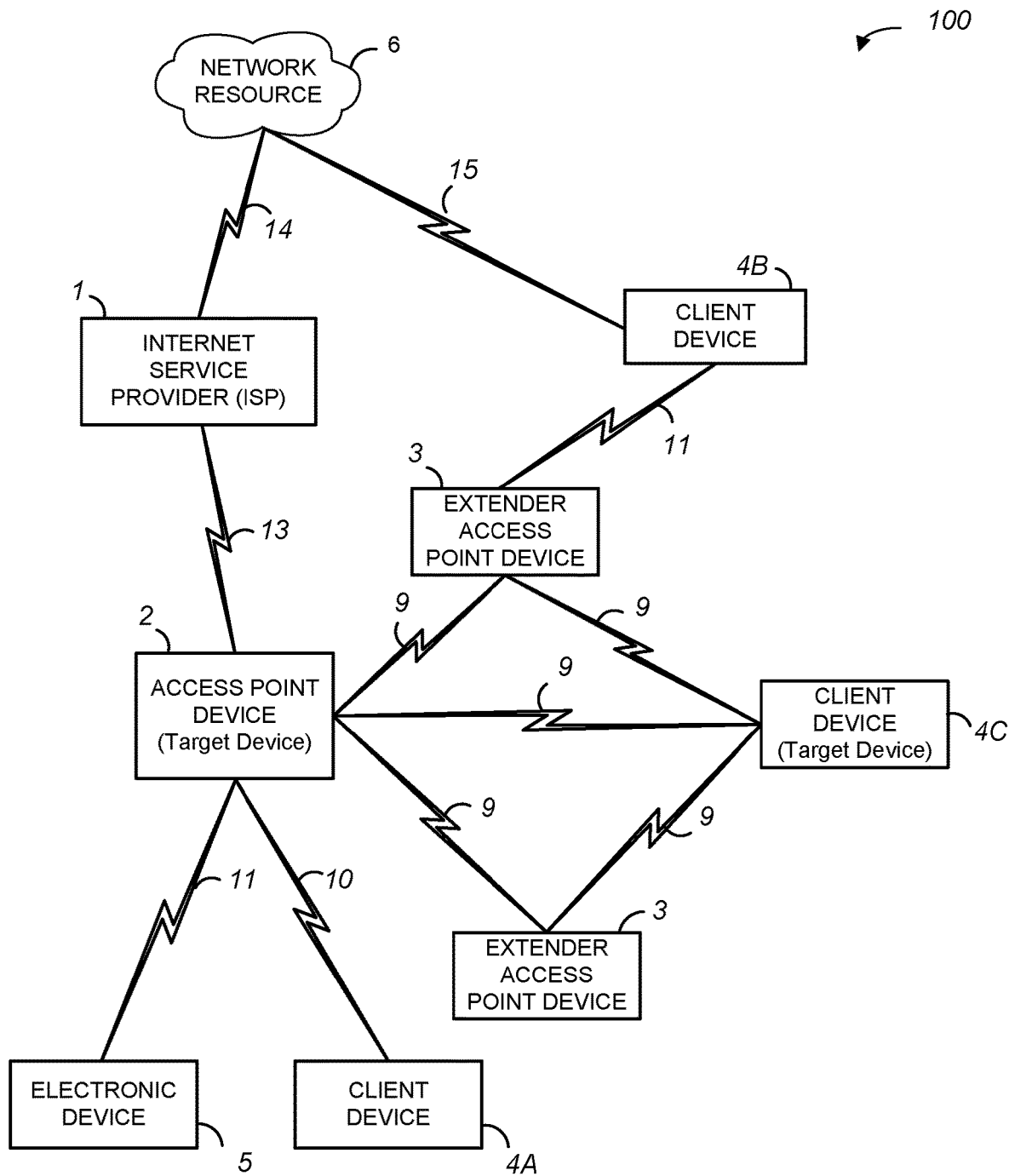
FIG. 1 is a schematic diagram of a network environment, according to one or more aspects of the present disclosure.

FIG. 1 is a schematic diagram of a network environment 100, according to one or more aspects of the present disclosure.

It should be appreciated that various example embodiments of inventive concepts disclosed herein are not limited to specific numbers or combinations of devices, and there may be one or multiple of some of the electronic apparatuses or network devices in the network environment discussed herein, which may itself consist of multiple communication networks and various known or future developed wireless connectivity technologies, protocols, devices, and the like.

As shown in FIG. 1, the main elements of the network environment 100 include a network comprising an access point device 2 connected to a network resource 6, such as any of a cloud-based or remote repository, a cloud-based or remote service, a cloud-hosted or remote application, any other network resource, or a combination thereof, via an Internet Service Provider (ISP) 1 and also connected to different wireless devices or network devices, such as one or more wireless extender access point devices 3, one or more client devices 4, for example, client devices 4A, 4B, and 4C, and an electronic device 5. In one or more embodiments, the network resource 6 can include a repository that comprises one or more secure areas. In one or more embodiments, the access point device 2, the client device 4C, or any combination thereof can be a target device that includes one or more features or functionality accessible by a user of the network environment 100. For example, the network resource 6 can be a video game resource for streaming a video game to an electronic device 5 (a gaming system). The video game resource can include a secure area associated with a particular user, for example, a user area, that is accessible by electronic device 5 via the access point device 2 that utilizes one or more tokens associated with the user area. The one or more tokens are received by a client device 4A executing a client web application (also referred to as a web app or a client web app) and sent to as well as stored at the access point device 2 executing a token receiver so as to provide access to the user area to the electronic device 5 via the access point device 2.

The network environment 100 shown in FIG. 1 includes wired and/or wireless network devices (e.g., access point device 2, extender access point devices 3, client devices 4, and electronic device 5) that may be connected in one or more wireless networks or local networks (e.g., private, guest, iControl, backhaul network, or Internet of things (IoT) network) or one or more wired networks within the network environment 100. Additionally, there could be some overlap between network devices (e.g., extender access point devices 3 and client devices 4) in the different networks. That is, one or more network or wireless devices could be located in more than one network. For example, the extender access point devices 3 could be located both in a private network for providing content and information to a client device 4 and also included in a backhaul network or an iControl network.

The ISP 1 can be, for example, a content provider or any computer for connecting the access point device 2 to the network resource 6. For example, the ISP 1 can provide a communication link between network devices, for example, to facilitate the transfer of one or more tokens from the network resource 6 to a client device 4A so that the client device 4A can send the one or more tokens to a token receiver at the target device 2 so as to provide on-demand access by the target device 2 to a secure area of the network resource 6. In one or more embodiments, network resource 6 can be associated with the provider of the access point device 2. The connection 14 between the network resource 6 and the ISP 1 and the connection 13 between the ISP 1 and the access point device 2 can be implemented using a wide area network (WAN), a virtual private network (VPN), metropolitan area networks (MANs), system area networks (SANs), a data over cable service interface specification (DOCSIS) network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G, 5G, or 6G network, for example.

The connection 13 can further include as some portion thereof a broadband mobile phone network connection, an optical network connection, or other similar connections. For example, the connection 13 can also be implemented using a fixed wireless connection that operates in accordance with, but is not limited to, 3rd Generation Partnership Project (3GPP) Long Term Evolution (LTE), 5G, or 6G protocols. It is also contemplated by the present disclosure that connection 13 is capable of providing connections between the access point device 2 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G or 6G network, for example.

The access point device 2 can be, for example, an access point and/or a hardware electronic apparatus that may be a combination modem and gateway that combines the functions of a modem, a gateway, an access point (AP), a firewall, a router, or a combination thereof for providing content received from the ISP 1 to one or more network devices (e.g., wireless extender access point devices 3 and client devices 4) in the network environment 100. In one or more embodiments, the access point device 2 provides any one or more network devices of the network environment 100 with access to a network resource 6 so as to provide an enhanced QoE, for example, to a secure area at the network resource 6. It is also contemplated by the present disclosure that the access point device 2 can include the function of, but is not limited to, a universal plug and play (UPnP) simple network management protocol (SNMP), an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The access point device 2 may also be referred to as a residential gateway, a home network gateway, or a wireless access point (AP).

The connection 9 between the access point device 2, the wireless extender access point devices 3, and client devices 4 can be implemented using a wireless connection in accordance with any IEEE 802.11 Wi-Fi protocols, Bluetooth™ (BLUETOOTH) protocols, BLUETOOTH low energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, or 60 GHz bands. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection. Any one or more of connections 9 can carry information on any of one or more channels that are available for use. In one or more embodiments, one or more network devices (such as any of the one or more extender access point devices 3, the one or more client device 4, or a combination thereof) are managed by access point device 2 such that access point device 2 can provide throttling management for the network.

The extender access point devices 3 can be, for example, wireless hardware electronic apparatuses such as access points (APs), extenders, repeaters, etc. used to extend the wireless network by receiving the signals transmitted by the access point device 2 and rebroadcasting the signals to, for example, client devices 4, which may be out of range of the access point device 2. The extender access point devices 3 can also receive signals from the client devices 4 and rebroadcast the signals to the access point device 2, or other client devices 4.

The connection 11 between the electronic device 5 and the access point device 2 can be implemented through a wireless connection that operates in accordance with any IEEE 802.11 Wi-Fi protocols, BLUETOOTH protocols, BLE, or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. Additionally, the connection 11 can be implemented using a wireless connection that operates in accordance with, but is not limited to, RF4CE protocol, ZigBee protocol, Z-Wave protocol, or IEEE 802.15.4 protocol. Also, one or more of the connections 11 can be a wired Ethernet connection. Any one or more connections 11 can carry information on any one or more channels that are available for use.

Any of the one or more client devices 4 can be, for example, a computer or server, a hand-held computing device, a personal computer, an electronic tablet, a mobile phone, a smart phone, a smart speaker, an Internet-of-Things (IoT) device, an iControl device, a portable music player with smart capabilities capable of connecting to the Internet, cellular networks, and interconnecting with other devices via Wi-Fi and Bluetooth, or other wireless hand-held consumer electronic apparatuses capable of executing and displaying content received through the access point device 2, for example, based on a request from a client device 4. Additionally, the one or more client devices 4 can be a television (TV), an IP/QAM set-top box (STB) or a streaming media decoder that is capable of decoding audio/video content, and playing over OTT or MSO provided content received through the access point device 2. Further, a client device 4 can be a network device that includes a web browser for accessing a secure area at a network resource 6 via the access point device 2. In one or more embodiments, a client device 4 is a target device 4C that includes a token receiver for receiving and storing one or more tokens associated with one or more features or functionality of the target device 4C. For example, target device 4C can comprise, a thermostat, a set-top box, a security system, a sprinkler system, any other remote controllable system, a gaming system, or any combination thereof. The token receiver allows for access to the one or more features or functionality of the target device 4C by any one or more other network devices, for example, via a network resource 6, access point device 2, extender access point device 3, or any combination thereof.

An electronic device 5 can include any type of dedicated device with a limited user interface. For example, the electronic device 5 can be a gaming system for interfacing with a gaming resource or service served via a network resource 6. The electronic device 5 has a limited user interface with respect to accessing any one or more network features, including the receiving and/or storing of one or more tokens for access to a network resource 6, such as utilizing the one or more tokens to access a secure area or user area of a remote repository of the network resource 6. In one or more embodiments, an access point device 2 or a client device 4A can be utilized to interface with the network resource 6 so as to provide the necessary one or more tokens to the access point device 2 such that the electronic device 5 can provide the functionality required, for example, to access a secure area of the network resource 6. In one or more embodiments, the electronic device 5 can be coupled directly to the access point device 2, an extender access point device 3, client device 4A, any other network device via any type of connection, or any combination thereof.

The connection 10 between the access point device 2 and a client device 4 is implemented through a wireless connection that operates in accordance with, but is not limited to, any IEEE 802.11 protocols. Additionally, the connection 10 between the access point device 2 and the client device 4 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The connection 10 can also be implemented using a wireless connection in accordance with BLUETOOTH protocols, BLE, or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. One or more of the connections 10 can also be a wired Ethernet connection.

Figure 2:
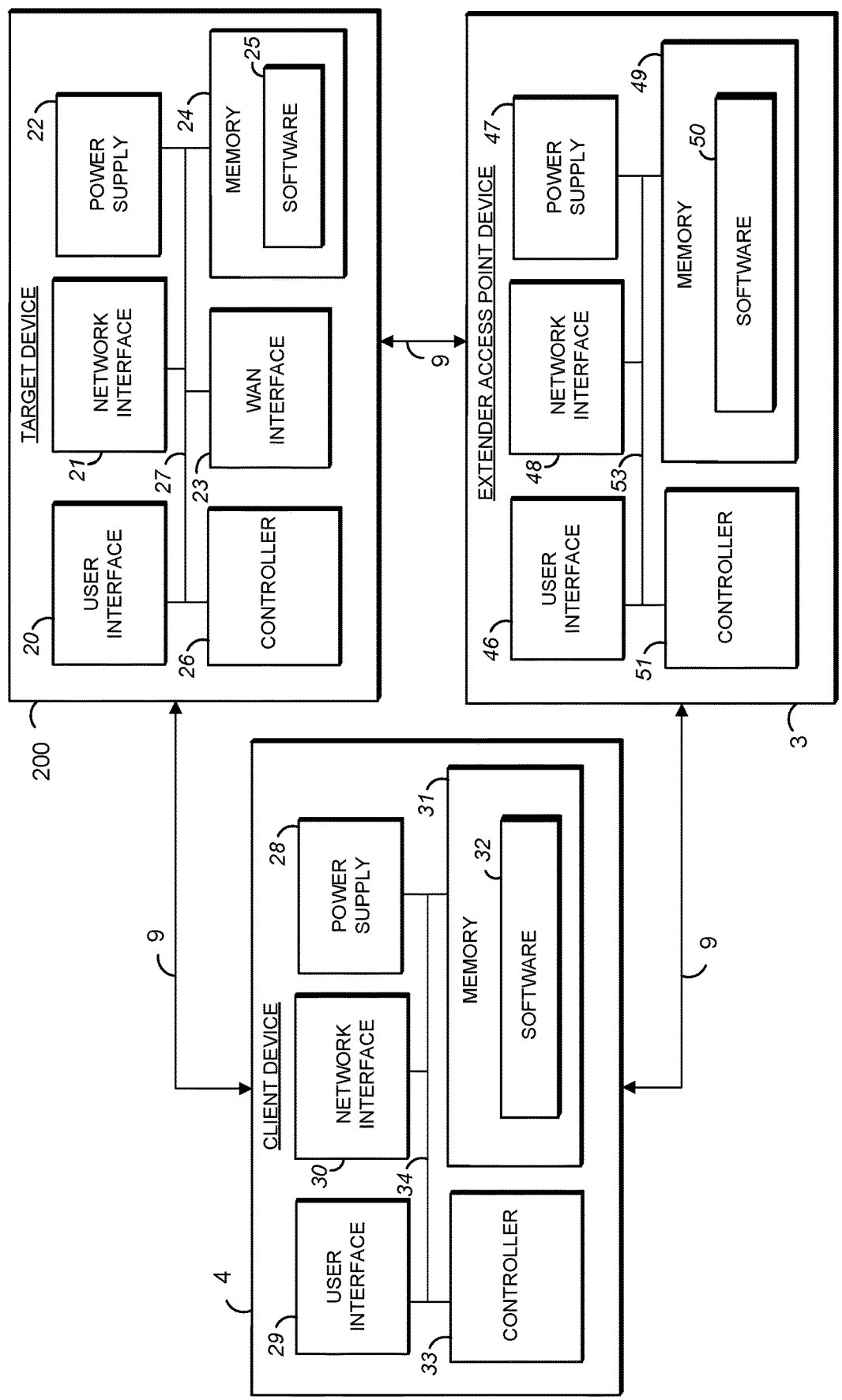
FIG. 2 is a more detailed block diagram illustrating various components of an exemplary target point device, client device, and extender access point device implemented in the network environment of FIG. 1, according to one or more aspects of the present disclosure.

A detailed description of the exemplary internal components of a target device, such as the access point device 2 and/or the client device 4C, the extender access point devices 3, and the client devices 4 shown in FIG. 1 will be provided in the discussion of FIG. 2. However, in general, it is contemplated by the present disclosure that the access point device 2, the extender access point devices 3, and the client devices 4 include electronic components or electronic computing devices operable to receive, transmit, process, store, and/or manage data and information associated with the network environment 100, which encompasses any suitable processing device adapted to perform computing tasks consistent with the execution of computer-readable instructions stored in a memory or a computer-readable recording medium (e.g., a non-transitory computer-readable medium).

Further, any, all, or some of the computing components in any network device, including the access point device 2, the extender access point devices 3, and the client devices 4 may be adapted to execute any operating system, including Linux™ (LINUX), UNIX, Windows™ (WINDOWS), Macintosh™ operating system (MacOS™), DOS, and Chrome™ operation system (Chrome OS™) as well as virtual machines adapted to virtualize execution of a particular operating system, including customized and proprietary operating systems. The network devices, including the access point device 2, the extender access point devices 3, and the client devices 4, are further equipped with components to facilitate communication with other computing devices or network devices over the one or more network connections to local and wide area networks, wireless and wired networks, public and private networks, and any other communication network enabling communication in the network environment 100.

FIG. 2 is a more detailed block diagram illustrating various components of an exemplary access point device, client device, and wireless extender implemented in the network environment 100 of FIG. 1, according to one or more aspects of the present disclosure.

Although FIG. 2 only shows one target device 200, one extender access point device 3 and one client device 4, the target device 200, the extender access point device 3 and the client device 4 shown in the figure are meant to be representative of any one or more target devices 200, one or more extender access point devices 3, and one or more client devices 4 of a network system, for example, network environment 100 shown in FIG. 1. Similarly, the connections 9 between the target device 200, the extender access point device 3, and the client device 4 shown in FIG. 2 are meant to be exemplary connections and are not meant to indicate all possible connections between the target devices 200, extender access point devices 3, and client devices 4. Additionally, it is contemplated by the present disclosure that the number of target devices 200, extender access point devices 3, and client devices 4 is not limited to the number of target devices 200, extender access point devices 3, and client devices 4 shown in FIGS. 1 and 2.

The client device 4 includes a power supply 28, a user interface 29, a network interface 30, a memory 31, and a controller 33. The power supply 28 supplies power to the internal components of the client device 4 through the internal bus 34. The power supply 28 can be a self-contained power source such as a battery pack with an interface to be powered through an electrical charger connected to an outlet (e.g., either directly or by way of another device). The power supply 28 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 29 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the client device 4, for example, for a user to enter a user input via a web application running in a web browser that is stored in the memory 31. In one or more embodiments, user interface 29 provides an interface for a user, such as a graphical user interface, for example, to provide an interface for a web app executing in a web browser, such as for client device 4A or client device 4B. The network interface 30 can include, but is not limited to, various network cards, interfaces, and circuitry implemented in software and/or hardware to enable communications with the target device 200, an access point device 2 and the extender access point device 3 using any one or more of the communication protocols in accordance with connection 9 (e.g., as described with reference to FIG. 1).

The memory 31 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software, or algorithms including software 32 for controlling the general function and operations of the client device 4 in accordance with the embodiments described in the present disclosure. In one or more embodiments, client device 4 is a network device and software 32 includes one or more instructions for establishing a connection with the target device 200 and/or an extender access point device 3 such that one or more requests, for example, a request associated with a web application to a secure area of a network resource 6. For example, software 32 can comprise a web browser that receives information from and sends information to a secure area of a network resource 6 via the target device 200. In one or more embodiments, memory 31 stores one or more tokens for communicating to a token receiver of the target device 200 such that one or more features or functionality associated with the target device 200 are accessible via any one or more client devices 4.

The controller 33 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 32 for controlling the operation and functions of the client device 4 in accordance with the embodiments described in the present disclosure. Communication between the components (e.g., 28-31 and 33) of the client device 4 may be established using an internal bus 34.

The extender access point device 3 can be, for example, any wireless hardware electronic apparatus used to extend a wireless network by receiving the signals transmitted by the access point device 2 and rebroadcasting the signals to any one or more client devices 4, which may be out of range of the access point device 2 including, but not limited to, a wireless extender, a repeater, and/or an access point. The extender access point device 3 can also receive signals from any one or more of the client devices 4 and rebroadcast the signals to the access point device 2 or any other one or more client devices 4. The extender access point device 3 can include a user interface 46, a power supply 47, a network interface 48, a memory 49, and a controller 51.

The user interface 46 can be similar to or the same as the user interface 29 of client device 4. The power supply 47 supplies power to the internal components of the wireless extender access point device 3 through the internal bus 53. The power supply 47 can be connected to an electrical outlet (e.g., either directly or indirectly by way of another device) via a cable or wire.

The network interface 48 can include various network cards, interfaces, and circuitry implemented in software and/or hardware to enable communications with the client device 4, a target device 200, and the access point device 2 using the communication protocols in accordance with connection 9 (e.g., as described with reference to FIG. 1). For example, the network interface 48 can include multiple radios or sets of radios (e.g., a 2.4 GHz radio, one or more 5 GHz radios, and/or a 6 GHz radio), which may also be referred to as wireless local area network (WLAN) interfaces. One radio or set of radios (e.g., 5 GHz and/or 6 GHz radio(s)) provides a backhaul connection between the wireless extender access point device 3 and the access point device 2, and optionally other wireless extender access point device(s) 3. Another radio or set of radios (e.g., 2.4 GHz, 5 GHz, and/or 6 GHz radio(s)) provides a fronthaul connection between the extender access point device 3 and one or more client device(s) 4.

The memory 49 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The memory 49 can be used to store any type of instructions, software, or algorithm including software 50 associated with controlling the general functions and operations of the wireless extender access point device 3 in accordance with the embodiments described in the present disclosure. In one or more embodiments, extender access point device 3 is a network device and software 50 includes one or more instructions for establishing a connection with the access point device 2, a target device 200, and/or a client device 4.

The controller 51 controls the general operations of the wireless extender access point device 3 and can include, but is not limited to, a CPU, a hardware microprocessor, a hardware processor, a multi-core processor, a single core processor, an FPGA, a microcontroller, an ASIC, a digital signal processor (DSP), or other similar processing device capable of executing any type of instructions, algorithms, or software for controlling the operation and functions of the wireless extender access point device 3 in accordance with the embodiments described in the present disclosure. General communication between the components (e.g., 46-51) of the extender access point device 3 may be established using the internal bus 53.

The target device 200 includes a user interface 20, a network interface 21, a power supply 22, a wide area network (WAN) interface 23, a memory 24, and a controller 26. The user interface 20 can include one or more elements to provide an interaction between a user and the target device 200. In one or more embodiments, the user interface 20 provides a limited user interface such that a user cannot setup via the target device 200 the necessary one or more tokens required to access a secure area of the network resource 6. In one or more embodiments, the user interface 20 only allows for an electronic communication with the target device 200 such that the user interface 20 does not provide a local or a physical interaction with the target device 200.

The network interface 21 may include various network cards, and circuitry implemented in software and/or hardware to enable communications with the extender access point device 3 and the client device 4 using the communication protocols in accordance with connection 9 (e.g., as described with reference to FIG. 1). Additionally, the various network cards, interfaces, and circuitry of the network interface 21 enable communications with a client device 4 (e.g., a mobile device) using the one or more communication protocols in accordance with connection 10 (e.g., as described with reference to FIG. 1). For example, the target device 200 can comprise an access point device 2 such that the network interface 21 can include an Ethernet port (also referred to as a LAN interface) and multiple radios or sets of radios (e.g., a 2.4 GHz radio, one or more 5 GHz radios, and/or a 6 GHz radio, also referred to as WLAN interfaces). One radio or set of radios (e.g., 5 GHz and/or 6 GHz radio(s)) provides a backhaul connection between the access point device 2 and the wireless extender access point device(s) 3. Another radio or set of radios (e.g., 2.4 GHz, 5 GHz, and/or 6 GHz radio(s)) provides a fronthaul connection between the access point device 2 and one or more client device(s) 4 and/or one or more electronic devices 5. In one or more embodiments, the network interface 21 interfaces with a network resource 6.

The power supply 22 supplies power to the internal components of the target device 200 through the internal bus 27. The power supply 22 can be connected to an electrical outlet (e.g., either directly or by way of another device) via a cable or wire. The wide area network (WAN) interface 23 may include various network cards, and circuitry implemented in software and/or hardware to enable communications between the target device 2 and the ISP 1 using the wired and/or wireless protocols in accordance with connection 13 (e.g., as described with reference to FIG. 1).

The memory 24 includes a single memory or one or more memories or memory locations that include, but are not limited to, a RAM, a DRAM, a memory buffer, a hard drive, a database, an EPROM, an EEPROM, a ROM, a flash memory, one or more logic blocks of a FPGA, hard disk or any other various layers of memory hierarchy. The memory 24 can be a non-transitory computer-readable storage medium used to store any type of instructions, software, or algorithm including software 25, for example, a token receiver. The token receiver can receive one or more tokens from a client device 4. The token receiver can store the one or more tokens in the memory 49. The one or more tokens can provide for access to one or more features or functionality associated with the target device 200. In one or more embodiments, the target device 200 can include a web server that is stored in memory 24 (for example, as a software 25), in a separate memory, or both. In one or more embodiments, the one or more tokens associated with a feature or functionality of target device 200 (such as access point device 2) are stored in memory 24 so as to provide for receiving and sending information or data to a secure area of the network resource 6.

The controller 26 controls the general operations of the target device 200 as well as provides access via a web server to one or more network resources 6 to any one or more network devices. The controller 26 can include, but is not limited to, a central processing unit (CPU), a network controller, a hardware microprocessor, a hardware processor, a multi-core processor, a single core processor, a FPGA, a microcontroller, an ASIC, a DSP, or other similar processing device capable of executing any type of instructions, algorithms, or software including the software 25 for throttling management in accordance with the embodiments described in the present disclosure. Communication between the components (e.g., 20-24, and 26) of the access point device 2 may be established using the internal bus 27. The controller 26 may also be referred to as a processor, generally.

Figure 3:
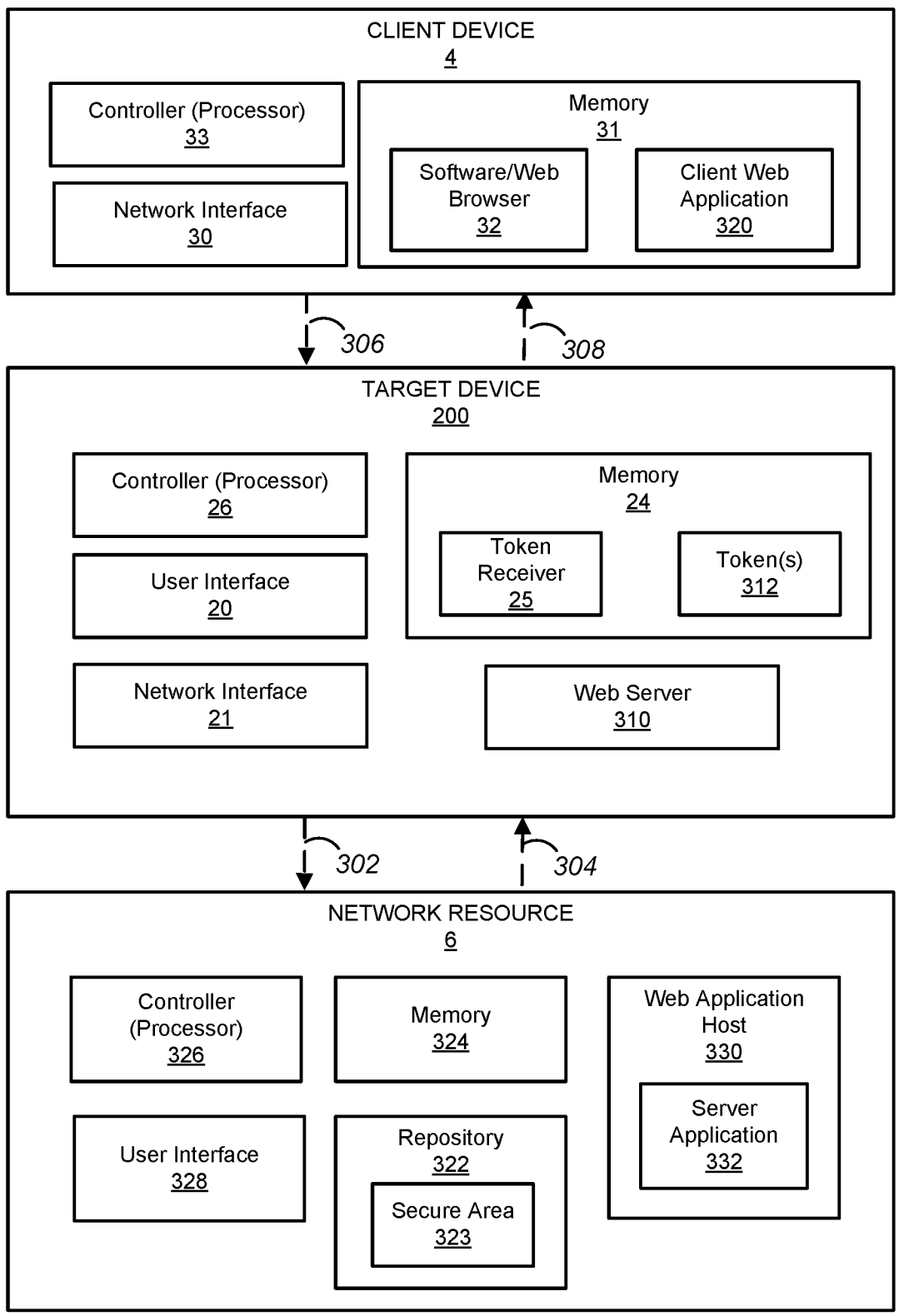
FIG. 3 is a more detailed block diagram illustrating certain components implemented in the network environment of FIGS. 1-2 for providing access to a network resource, according to one or more aspects of the present disclosure.

FIG. 3 is a more detailed block diagram illustrating certain components of an exemplary target device 200 implemented in the network environment of FIG. 1 and in FIG. 2, according to one or more aspects of the present disclosure.

As shown in FIG. 3, the target device 200 includes a network interface 21, a memory 24, a user interface 20, a controller (processor) 26, and a web server 310. In one or more embodiments, the web server 310 is part of or stored in memory 24. The memory 24 can include a software or token receiver 25, a web server 310, or both that allows for interfacing with a network resource 6, one or more network devices, or both. The memory 24 can store one or more tokens 312 associated with one or more features or functionality of the target device 200.

The controller 26 includes a processor that is configured to access the memory 24, perform the one or more management functions (e.g., via execution of the token receiver 25) and/or execute one or more computer-readable instructions associated with token receiver 25, web server 310, any other application, program or service, and any combination thereof. The processor of the controller 26 also controls communications with the network or one or more network devices (e.g., the wireless extender access point devices 3, the client devices 4, network resource 6, another target device 200, any other network devices, or a combination thereof) via an Ethernet port, a 2.4 GHz radio, and/or the 5 GHz radio in accordance with embodiments described in the present disclosure.

In one or more embodiments, the network interface 21 interfaces with a network resource 6. In one or more embodiments, the target device 200 can be coupled directly or indirectly to the network resource 6, for example as illustrated in FIG. 1. That is, for example, the network interface 21 can communicate via an access point device 2 and/or as the access point device 2 to the network resource 6. For example, the target device 200 can transmit a request 302, via a network interface 21, to network resource 6 and can receive a response 304, via the network interface 21, such as by utilizing connection 13 to ISP 1 and connection 14 to network resource 6 as discussed with reference to FIG. 1.

In one or more embodiments, the network resource 6 can be a computing device (e.g., a server, a computer, an electronic apparatus, and/or any other network device), a web site, a repository or library such as a database, data structure, or a flat-file system, a web page, a backend processing system, a cloud-based resource, any other resource that can store and communicate information, or any combination thereof. Network resource 6 can comprise a controller 326 (e.g. a processor or CPU), a user interface 328, a memory 324, a repository 322, and a web application host 330. The repository 322 can include one or more secure areas 323. A secure area 323 can be a memory location with restricted access such that a token or any other security credential is required for access to the memory location. In one or more embodiments, the secure area 323 can be associated with an application, a user, a network or electronic device, a network resource, any other type of software or device, or any combination thereof. A secure area 323 can be a user area associated with a user of a gaming system. The web application host 330 can include one or more computer-readable instructions stored in a memory 324 and executable by the controller 326 to serve the client web application 320 to a network device, such as a client device 4B or client device 4A, and receive information and data from the target device 200 via the access point device 2. In one or more embodiments, the request 302 can comprise one or more commands or instructions to store data or information in a secure area of memory 324, repository 322, or both. In one or more embodiments, the request 302 is for one or more tokens 312 and response 304 comprises the one or more tokens 312. The one or more tokens 312 can comprise one or more credentials, one or more personal identification numbers (PIN(s)), any other security parameter, or any combination thereof.

In one or more embodiments, the client device 4 includes a controller 33, a network interface 30, and a memory 31. Memory 31 can include a software 32, such as a web browser. Memory 31 can also include a client web application 320 that is executed via the web browser 32. The client web application 320 can be loaded locally to the client device 4 or can be loaded from the web server 310. For example, a user can launch a client web application 320 via the web browser 32 which initiates a request 306 via the access point device 2. In response, the access point device 2 sends a request 302 to the network resource 6. The web application host 330 of the network resource 6 can run a server application 332 so as to provide one or more webpages associated with the server application 332 or data from the repository 322 to the client device 4 such that the server application 332 sends a response 304 to the request 302 that includes one or more tokens 312, one or more instructions associated with server application 332, or both to the target device 200 which sends the response 304 as a response 308 to the client device 4 for processing by the client web application 320 running on the web browser 32. The client device 4 can store the one or more tokens 312 in memory 31 and the client web application 320 can provide the one or more tokens via an HTTP request to the target device 200. The target device 200 can store the one or more tokens 312 in memory 24 so that the target device 200 can, for example, later use the one or more tokens 312 to access a secure area 323 of repository 322 via an HTTPS request.

Figure 4:
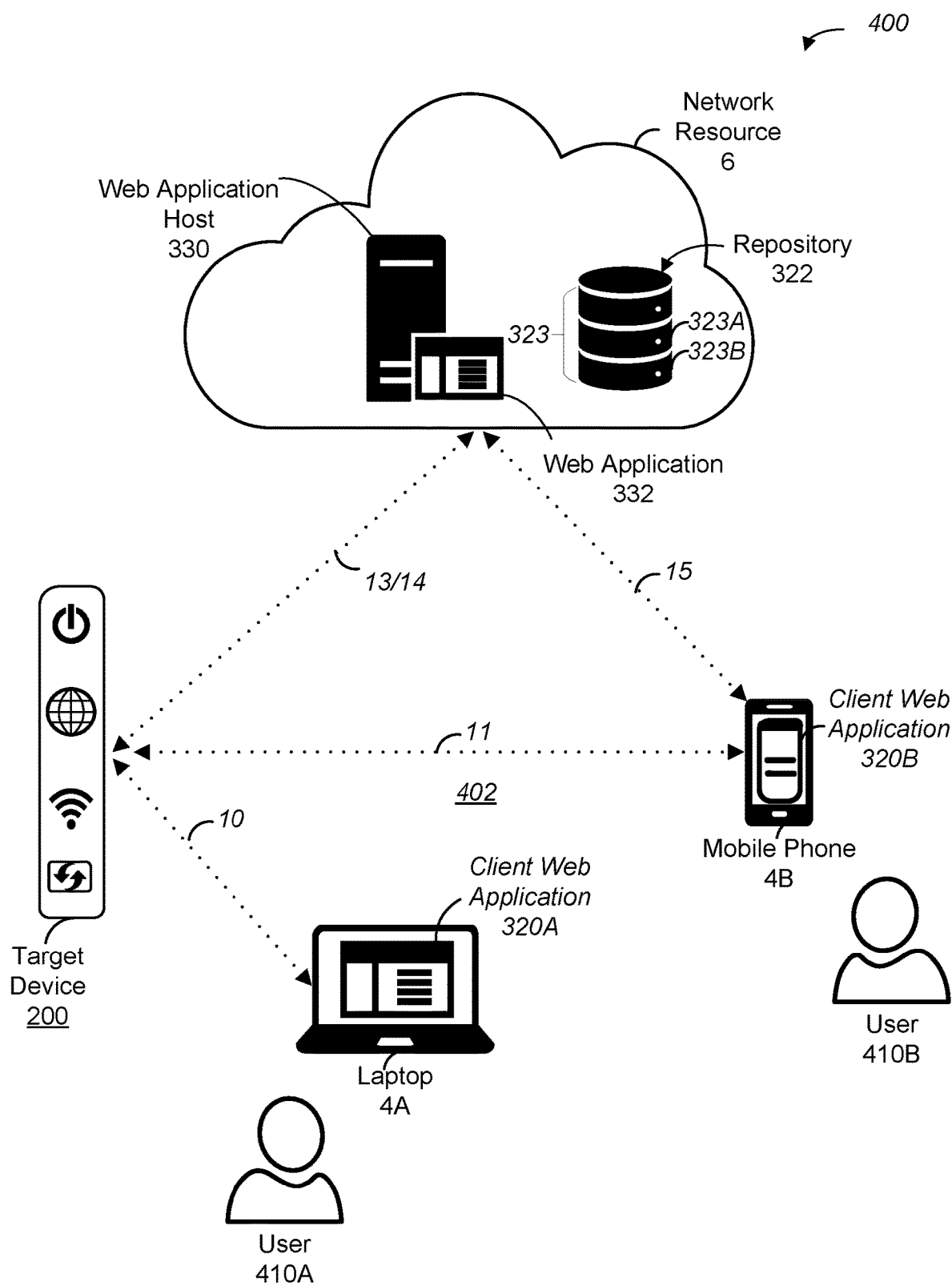
FIG. 4 is an exemplary network environment for access to a network resource, according to one or more aspects of the present disclosure.

FIG. 4 is an exemplary network environment 400 for access to a network resource 6, according to one or more aspects of the present disclosure. The network environment 400 includes a network resource 6 and a user environment 402. The user environment 402 includes a target device 200, a first client device 4A (for example, a laptop 4A) associated with a user 410A, and a second client device 4B (for example, a mobile phone 4B) associated with a user 410B. The present disclosure contemplates that any number of users, network devices and network resources can be included within the network environment 400.

In one or more embodiments, the target device 200 illustrated in FIG. 4 can be an access point device 2. A user 410A can launch a client web application 320A via a web browser 32 stored on the laptop 4A. The client web application 320A can comprise a web-based application. For example, a web application host 330 can serve a server application 332 as the client web application 320A running on the laptop 4A via a web browser 32. The client web application 320A can be served from the network resource 6 securely via a hyper-text transfer protocol secure (HTTPS) communication. For example, the user 410A can select a shortcut associated with or enter in the web browser 32 a uniform resource location (URL). The shortcut can be a link to the URL and be selected by clicking an icon displayed on the user interface 29 of the laptop 4A. The URL can be associated with an HTTPS web page of the server application 332 served by the web application host 330. The web browser 32 sends and receives data or information via an access point device 2 (target device 200) to a network resource 6, such as a server application 332. The user 410A can enter via the client web application 320A one or more login credentials, for example, a username, a password, a passkey, a PIN, any other credential, or a combination thereof. The one or more login credentials are sent via the access point device 2 to the server application 332 of the network resource 6. The server application 332 can provide to the client web application 320A one or more tokens 312 that allow for access to an associated secure area 323A of the repository 322. These one or more tokens 312 are utilized by the client web application 320A to establish a link between the access point device 2 (target device 200) and the associated secure area 323A as discussed with reference to FIGS. 6A, 6B, 6C, 7A and 7B.

In one or more embodiments, a user 410B associated with a mobile phone 4B can launch a client web application 320B via a web browser 32 stored on the mobile phone 4B. The client web application 320B can comprise a web-based application. For example, a web application host 330 can serve a server application 332 as the client web application 320B running on the smart phone 4B via a web browser 32. The client web application 320B can be served from the web application host 330 securely via a hyper-text transfer protocol secure (HTTPS) communication. For example, the user 410B can select a shortcut associated with or enter in the web browser 32 a uniform resource location (URL). The shortcut can be an icon displayed on the user interface 29 of the mobile phone 4B. The URL can be associated with a HTTPS web page of a client web application 320B served via the server application 332. The web browser 32 sends a request via the access point device 2 (target device 200) to the network resource 6 to provide the server application 332 associated with the URL. The user 410B can enter via the client web application 320B one or more login credentials, for example, a username, a password, a passkey, any other credential, or a combination thereof. The one or more login credentials are sent via the access point device 2 (target device 200) to server application 332 of the web application host 330. The server application 332 can provide to the client web application 320B one or more tokens that provide for access to an associated secure area 323B of the repository 322. These one or more tokens are utilized by the client web application 320B to establish a link between the access point device 2 (target device 200) and the associated secure area 323B as discussed with reference to FIGS. 5A, 5B, 6A, 6B, and 7A.

While FIG. 4 illustrates connections 10, 11, 13, 14, and 15, the present disclosure contemplates that any one or more of these connections can be established as discussed with reference to any connection in FIG. 1 or any combination thereof.

Figure 5A:
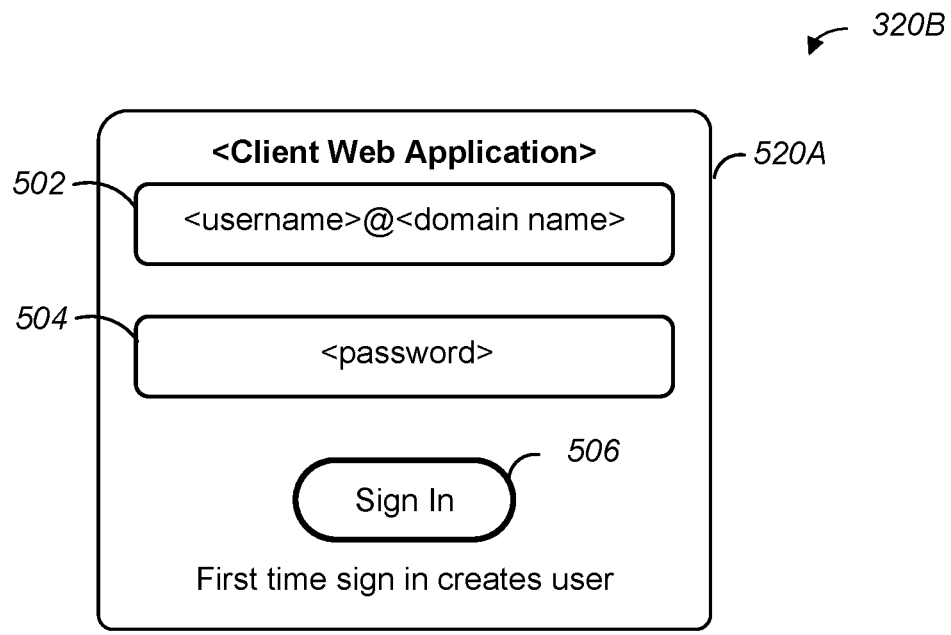
FIGS. 5A and FIG. 5B illustrate an exemplary client web application, according to one or more aspects of the present disclosure.
Figure 5B:
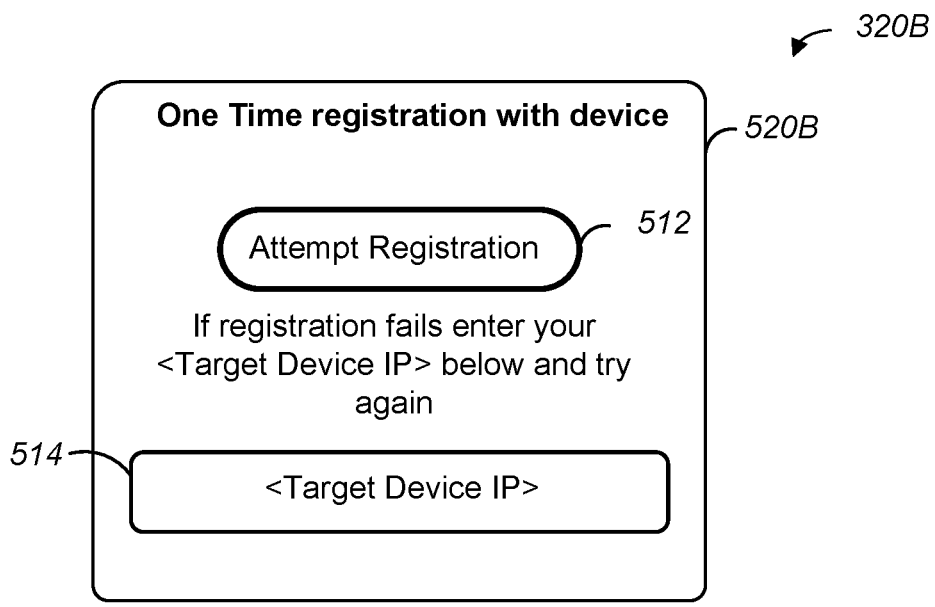

FIGS. 5A and FIG. 5B illustrate an exemplary client web application 320B of a mobile phone 4B, according to one or more aspects of the present disclosure. For example, a user 410B can enter at a first web page 520A of FIG. 5A one or more login credentials, such as a login name 502 and a password 504. The first web page 520A can be associated with a first HTTPS URL served by the web application host 330. The first web page 520A can appear or function similar to a typical mobile application such that the experience of or the interface with user 410B is similar to any other app or application loaded on the mobile phone 4B. The user 410B can select a user interface input 506, such as a sign-in button, that causes the client web application 320B to send the one or more login credentials to the server application 332 using an HTTPS protocol. In response, the server application 332 can send one or more tokens 312 to the client web application 320B. The one or more tokens 312 can be associated with a secure area 323B of a repository 322 stored at a network resource 6, any other repository, or a combination thereof. For example, a secure area 323B can be one or more memory locations within repository 322 associated with the one or more login credentials entered by the user 410B.

After receiving the one or more tokens 312, the client web application 320B via a web browser 32 can display the interface 520B of FIG. 5B. The user 410B can be presented with a link, for example, represented by a user interface element, such as a user input 512. The link can include an IP address of the target device 200 and the one or more tokens 312. In one or more embodiments, the IP address of the target device 200 can be received via a user input 514 and used to create an HTTP URL, for example, based on a user prompt, a multi-cast domain name system (MDNS) technique used by the target device 200 to advertise its address, any other network address acquisition process, or a combination thereof. Selection of the link 512 by the user 410B launches a second web page that provides the one or more tokens 312 to the target device 200. This second web page, for example, an HTTP URL, can be displayed momentary or even without the user 410B noticing any presentation of the second web page. The target device 200 can store the one or more tokens 312 in a memory 24 so as to a establish a link to the secure area 323B.

Figure 6A:
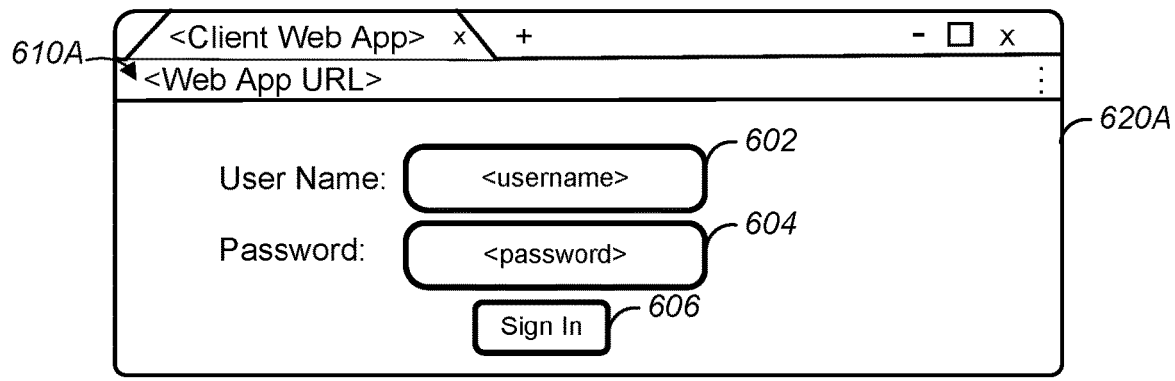
FIGS. 6A, 6B, and 6C illustrate an exemplary client web application, according to one or more aspects of the present disclosure.
Figure 6B:
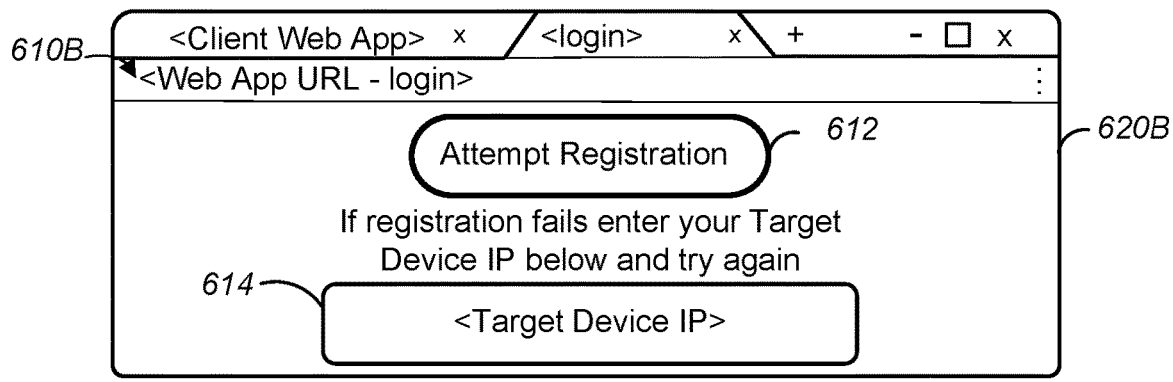
Figure 6C:
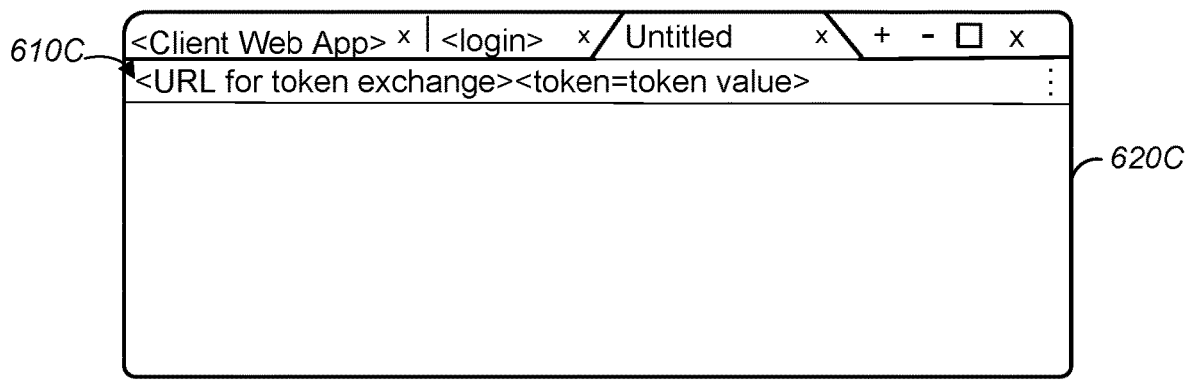

FIGS. 6A, 6B, and 6C illustrate an exemplary client web application 320A of a laptop 4A, according to one or more aspects of the present disclosure. For example, a user 410A can enter at a first HTTPS URL 610A associated with a first web page 620A of FIG. 6A one or more login credentials, such as a login name 602 and a password 604. The first web page 620A can be served by the web application host 330. The user 410A can select a user interface input 606, such as a sign-in button, that causes the application 320A to send the one or more login credentials to the server application 332 using an HTTPS protocol. The server application 332 can send one or more tokens 312 to the client web application 320A. The one or more tokens 312 are associated with a secure area 323A of a repository 322 stored at a network resource 6. The secure area 323A can be one or more memory locations within repository 322 associated with the one or more login credentials entered by the user 410A. After receiving the one or more tokens 312, the client web application 320A can display an interface 620B of FIG. 6B. The user 410A can be presented with a link, for example, represented by a user interface elements, such as a user input 612. Selection of the link 612 by the user 410A launches a second web page or new browser window 620C of FIG. 6 that provides the one or more tokens 312 to the target device 200 as part of the URL, for example, an HTTP URL 610C. This second web page 620C can be displayed momentary or even without the user 410A noticing any presentation of the second web page. The target device 200 can store the one or more tokens 312 in a memory 24 so as to a establish a link to the secure area 323B.

In one or more embodiments, the target device 200 of FIG. 4 is a network device that controls one or more environmental parameters associated with the user environment 402. The one or more environmental parameters can be associated with the type of target device 200. For example, the types of target devices 200 can include an access point device 2 (associated with network traffic, network throughput, network bandwidth, network access, etc.), a thermostat (associated with a temperature, a humidity, a fan speed, a sensor, etc.), a security system (associated with a camera, an alarm, a motion detector, any other senor, etc.), a sprinkler system (associated with rain gauge, a sensor, a controller, etc.), a set-top box (associated with a digital recorder setting, a programming guide, a power setting, any other setting, etc.), any other network device associated with any one or more other environmental parameters, or a combination thereof.

For example, the target device 200 can be a thermostat that includes one or more settings that are remotely controllable via network resource 6. A user can 410B can determine or select the thermostat (target device 200) for receiving one or more tokens 312. The user 410B can interface with the client web application 320B of a client device 4B. The client device 4B is connected to the same network as the thermostat (target device 200). The user 410B can select the "Attempt Registration" button (for example, user input 512 of FIG. 5B or user input 612 of FIG. 6B) of the web page (for example, interface 520B of FIG. 5B or interface 620B of FIG. 6B). The client web application 320B is restricted by the web browser 32 executing on the client device 4B as to the type of communications that are permitted or allowed. The web browser 32 prevents the client web application 320B from using HTTP communications as the client web application 320B originally served via HTTPS. To overcome this restriction on HTTP communications, the client web application 320B requests opening a new browser window (for example, the second web page 620C of FIG. 6C) based on a selection, such as a user input clicking on user input 612, and provides an IP address of the thermostat (target device 200) along with the token 312 encoded within the URL as a parameter. The web browser 32 allows opening a new browser window as the new browser window is triggered by a user action, for example, the selecting or clicking on the user input 512. To open the new browser window, the web browser 32 performs an HTTP get request to the thermostat (target device 200) using the supplied URL. The token receiver 25 of the thermostat (target device 200) accepts the HTTP request and reads the URL of the HTTP request. The token receiver 25 extracts the token 312 from the URL parameters and stores the token 312 in memory 24.

The token receiver 25 can provide a web page to the web browser 32 in response to the HTTP request. However, the client web application 320B is further restricted by the web browser 32 such that the client web application 320B cannot access the response of the token receiver 25 to the web browser 32 or view the contents of the newly opened window. The thermostat (target device 200) uses the received token 312 to write to the secure area 323 of the network resource 6. The client web application 320B previously had access to the secure area 323 of the network resource 6. The client web application 320B receives or detects the write to the secure area 323 by the token receiver 25 which confirms that the thermostat (target device 200) has received the required token 312. The client web application 320B closes the new browser window, for example, the second web page 620C of FIG. 6C.

As the thermostat (target device 200) can now access the secure area 323 of the network resource 6, the thermostat (target device 200) can read data, such as one or more settings, or any other information, stored in the secure area 323 no matter which network device was the originator of the data. The thermostat (target device 200) can check the data against one or more internal settings and make any necessary modification to one or more controls so as to provide a user environment indicated by the data stored in the secure area 323. The thermostat (target device 200) can check the secure area 323 for updates based on a timer, a semaphore, a periodic status update, a trigger (such as an event), a notification from the network resource 6 where the notification can be real-time or delayed, a user input, any other indicator or criteria, or any combination thereof. In this way, any network device (whether local to or remote from the network environment of the thermostat (target device 200)) with access to the secure area 323 of the network resource 6 can control the thermostat (target device 200) by reading data from, writing data to or both the secure area 323.

Figure 7A:
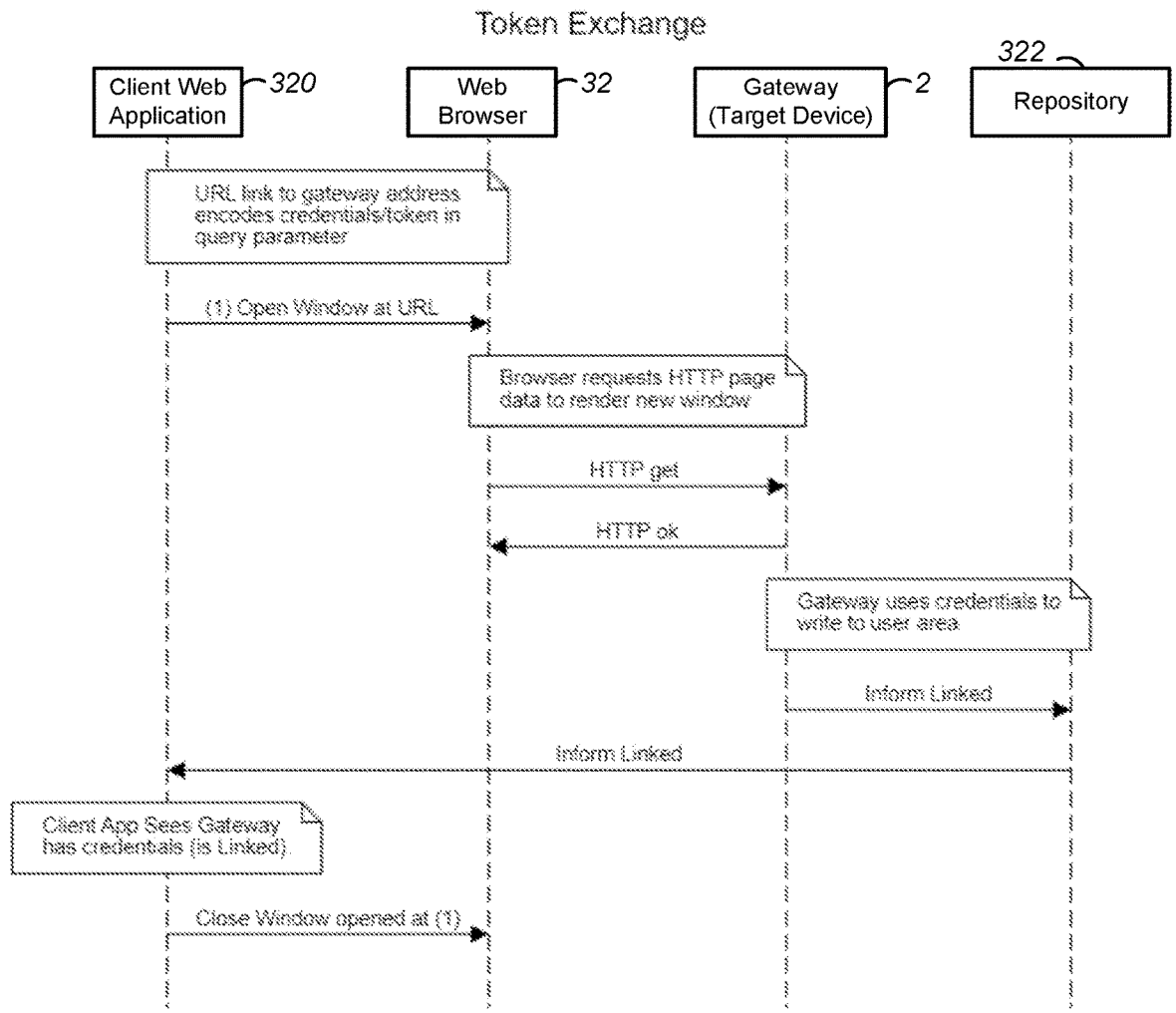
FIGS. 7A and 7B illustrates an exemplary token exchange, according to one or more aspects of the present disclosure.
Figure 7B:
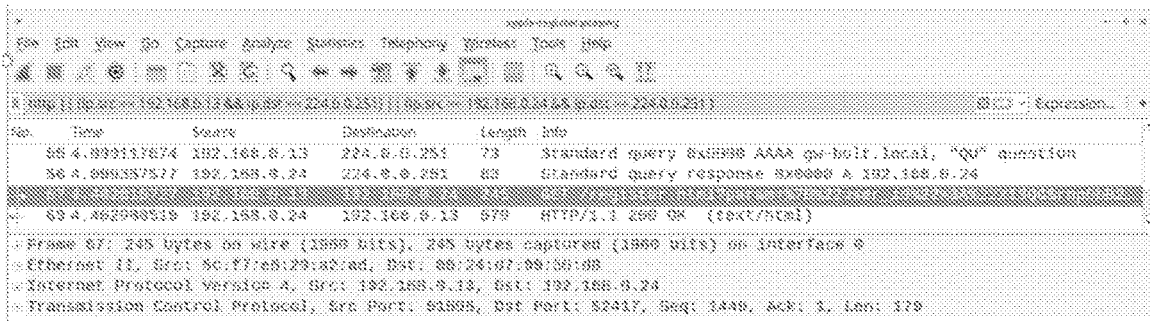

FIGS. 7A and 7B illustrate an exemplary token 312 exchange, according to one or more aspects of the present disclosure. In one or more embodiments, as illustrated in FIG. 7A, a server application 332 can be linked via the target device 200, such as an access point device 2 or referred to in this example as a gateway 2 (the target device), to a client web application 320 such that a secure area 323 can be accessed by the client web application 320. For example, a client web application 320 executing in a web browser 32 can open a new browser window at a URL link associated with the gateway 2. The URL link includes an internet protocol (IP) address of the access point device 2 that encodes the one or more tokens as a query parameter, for example, as illustrated in FIG. 6C as HTTP URL 610C. The web browser 32 can send the request for the HTTP page data to render the new browser window, for example, as an HTTP "GET" request. In response, the gateway 2 can send an HTTP response to the web browser 32, for example, an HTTP "OK" response. The gateway 2 can use the one or more tokens 312 to write to a secure area 323 of a repository 322 such that a link is established between the secure area 323 and the client web application 320. The client web application 320 is informed of the link, that the gateway 2 can access the secure area 323, by the receipt of data or information from the secure area 323. For example, the network resource 6 can send a notification, such as from server application 332, to the client web application 320 via the gateway 2. The notification can include information indicative of the link or that the gateway 2 can assess the secure area 323. The client web application 320 can receive the notification from the gateway 2 and based on the notification can close the new browser window as the link is established. In this way, the gateway 2 can read and/or write data or information to and/or from the secure area 323 as the gateway 2 has the required one or more tokens 312 required to access the secure area 323 stored in a memory 24, a remote repository 322, or both.

FIG. 7B illustrates a transfer of data or information between the client device 4 and the web server 310. For example, the "Info" indicates that the third listed transaction included an HTTP GET from the web browser 32 and the gateway 2. The HTTP GET included not only the URL but also one or more tokens as part of the query parameter "param". The "Info" also indicates that the fourth listed transaction included an acknowledgement (such as an "HTTP/1.1 200 OK") from the gateway 2 to the web browser 32.

The gateway 2 may be programmed with one or more computer-readable instructions to access a secure area 323 of a repository 322 that when executed by a controller 26 cause the gateway 2 to provide data or information to a client device 4, according to one or more embodiments. The link established to the secure area 323 can be used for various setup and monitoring of one or more parameters associated with the gateway 2.

Figure 8:
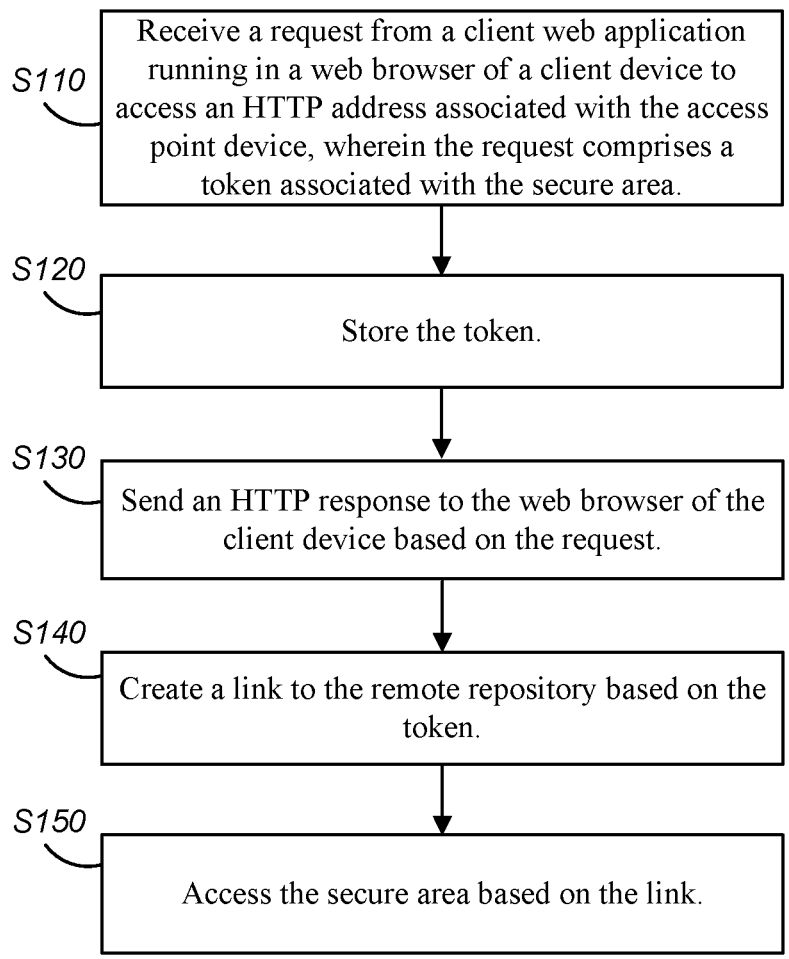
FIG. 8 is a flow chart illustrating a method for accessing a secure area of a remote repository, according to one or more aspects of the present disclosure.

FIG. 8 illustrates a method for accessing a secure area of a remote repository, according to one or more aspects of the present disclosure. In FIG. 8, it is assumed that any one or more of the devices include their respective controllers and their respective software stored in their respective memories, as discussed above in connection with FIGS. 1-4, which when executed by their respective controllers perform the functions and operations in accordance with the example embodiments of the present disclosure (e.g., including performing a configuration of one or more network devices). While the steps S110-S150 are presented in a certain order, the present disclosure contemplates that any one or more steps can be performed simultaneously, substantially simultaneously, repeatedly, in any order or not at all (omitted).

At step S110, a target device 200 receives a request, for example, an HTTP request, from a client web application 320 running in a web browser 32 of a client device to access an HTTP URL associated with the target device 200. In one or more embodiments, a token receiver 25 of the target device 200 receives the HTTP request. The request can comprise a token 312 associated with a secure area 323 of a remote repository 322 of a network resource 6. The token 312 can be included as part of the HTTP URL address. For example, the token 312 can be encoded as a query parameter of the HTTP URL. In one or more embodiments, the token 312 can be received by the client web application 320 from the network resource 6, for example, from a server application 332 as discussed with reference to FIGS. 5A, 5B, 6A and 6B. In one or more embodiments, the target device 200 is an access point device 2, a client device 4, or any other network or electronic device.

At step S120, the target device 200 stores the token. For example, a token 312 can be stored in a memory 24 of the target device 200. The token 312 allows the target device 200 to access the secure area 323 of a repository 322 at a network resource 6. At step S130, the target device 200 sends the web browser 32 an HTTP response that is indicative of a status of the request, for example, the HTTP response can include any one or more HTTP response status codes based on the HTTP request that acknowledges the HTTP request. In one or more embodiments, the HTTP response comprises a web page, for example, that is momentarily or temporarily displayed while the link between the gateway 2 and the repository 322 or the user area 323 of the repository 322 is created as discussed with reference to FIG. 6C.

At step S140, the target device 200 creates a link to the remote repository 322 based on the token 312. The link can be created by writing to the secure area 323 based on the token 312. For example, the target device 200 can gain access to the secure area 323 using the token 312 received from the client web application 320. In one or more embodiments, creating the link to the remote repository 322 comprises writing to the secure area 323 based on the token 312. For example, the target device 200 can write predetermined value, character, any other sequence in the secure area 323 so as to indicate that the link has been created. In one or more embodiments, creating the link to the remote repository 322 comprises receiving a notification from the server application 332 directed to the client web application 320. The target device provides the notification to the client web application 320. This notification can indicate to the client web application 320 that the web page at step S130 can be closed.

At step S150, the target device 200 accesses the secure area 323 based on the link. In one or more embodiments, the target device 200 can be an access point device 2. The access point device 2 can receive an instruction with associated data from a client device 4 or other electronic device and can store the data in the secure area 323.

Figure 9:
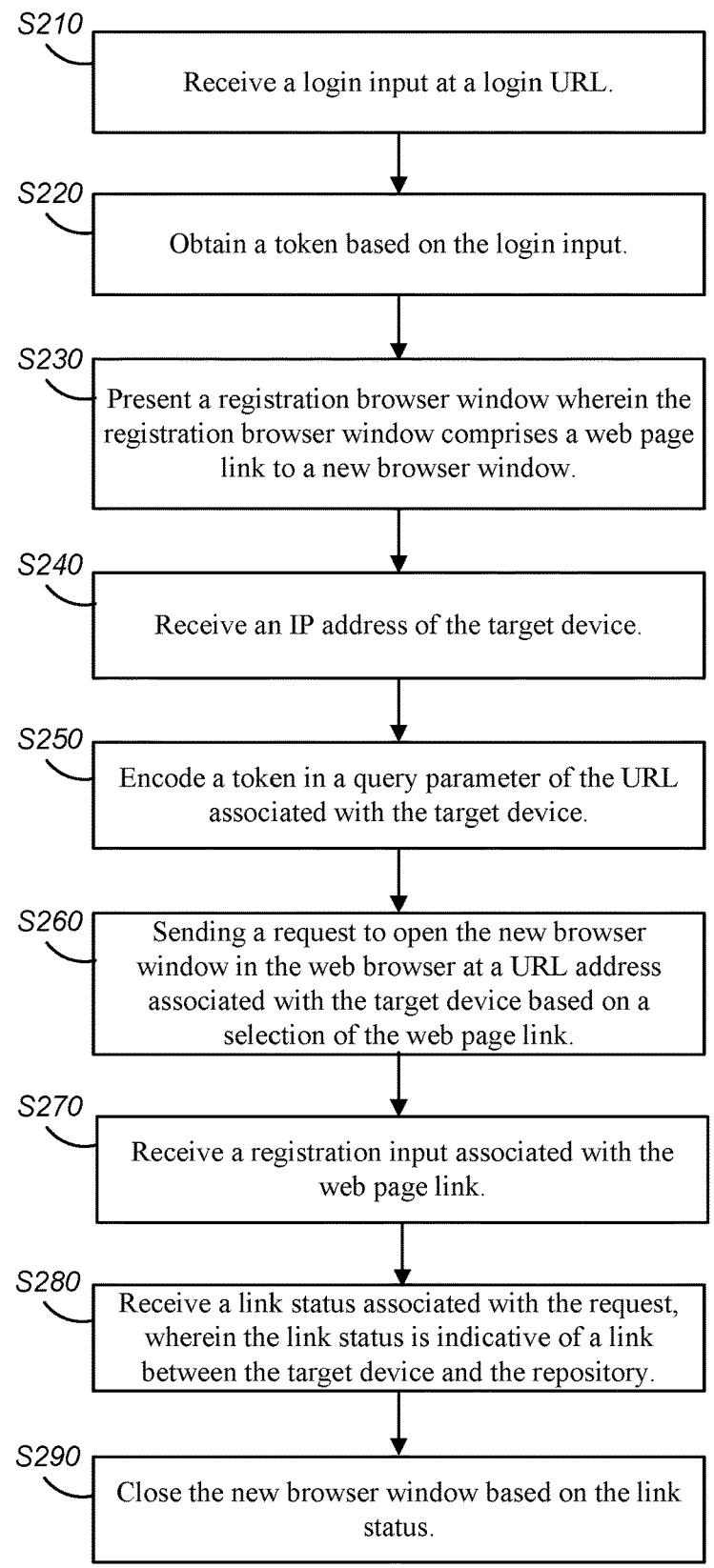
FIG. 9 is a flow chart illustrating a method for a client web application running in a web browser to access a secure area of a remote repository, according to one or more aspects of the present disclosure.

FIG. 9 illustrates is a flow chart illustrating a method for a client web application 320 running in a web browser 32 to access a secure area 323 of a remote repository 322, according to one or more aspects of the present disclosure. In FIG. 9, it is assumed that any one or more of the devices include their respective controllers and their respective software stored in their respective memories, as discussed above in connection with FIGS. 1-4, which when executed by their respective controllers perform the functions and operations in accordance with the example embodiments of the present disclosure (e.g., including performing a configuration of one or more network devices). While the steps S210-S290 are presented in a certain order, the present disclosure contemplates that any one or more steps can be performed simultaneously, substantially simultaneously, repeatedly, in any order or not at all (omitted).

At step S210, the client web application 320 can receive a login input at a login URL. The login input can be for accessing a server application 332, such as a streaming gaming application. For example, the login URL can be a URL associated with a web page that includes one or more user inputs, for example, as discussed with reference to FIG. 5A or FIG. 6A, for obtaining one or more credentials that can be used as a token, to obtain a token from a server application 332, or both. In one or more embodiments, a token 312 can be created by the client web application 320 based on the login input, for example, a username and password.

At step S220, the client web application 320 obtains a token 312 from a network resource 6. In one or more embodiments, the token 312 is obtained from a repository 322 at the network resource 6. In one or more embodiments, the token 312 can be created by the network resource 6, for example, by a server application 332, based on the login input.

At step S230, the client web application 320 via the web browser 32 presents a registration browser window based on the login input from step S210. The registration browser window can comprise a web page link to a new browser window that allows for providing the target device with a token for access to a secure area 323 at a repository 322, for example, as discussed with reference to FIG. 5B or FIG. 6B.

At step S240, the client web application 320 receives an IP address of a target device 200. For example, the IP address can be received from a user as a user input, for example, as discussed with reference to FIG. 5B or FIG. 6B. In one or more embodiments, the IP address is obtained by querying the network, a configuration file, a registry, a user, any other location or device, or a combination thereof.

At step S250, the client web application 320 encodes a token 312 in a query parameter, for example, a query parameter of an HTTP URL. For example, in response to a user input at the registration browser window, the client web application 320 can encoded the token 312 as a query parameter. At step S260, the client web application 320 requests to open a new browser window in a web browser 32 at a URL address associated with the target device 200 based on a selection of the web page link, such as discussed with respect to FIG. 6C. In one or more embodiments, a user can utilize a mouse, a touchscreen, any other selection device, or any combination thereof to click or select a user input associated with the web page link. The URL address specifies an HTTP address including the IP address from step S240 along with the token 312 as the query parameter from step S250. The URL address can also include an instruction encoded as a query parameter to access a secure area 323 of the repository 322. In response to the window open request, the web browser 32 makes the HTTP request to the target device 200 providing the entire URL address. The target device 200 reads the query parameter to obtain the token 312. In this way the target device 200 can interface with a secure area 323 by using the token 312. In one or more embodiments, the target device 200 can be connected to a client device 4A and utilize the token 312 to access a secure area 323 associated with an application or a user of the client device 4A.

At step S270, the client web application 320 receives a registration input associated with the web page link of step S230, for example, a user input 512 or 612 discussed with reference to FIG. 5A or FIG. 6A, respectively. The registration input can indicate an activation of the web page link, for example, that a communication interface has been established with the target device 200.

At step S280, the client web application 320 receives a link status associated with the request. This link status can be indicative of a link between the target device 200 and the repository 322, for example, a secure area 323. The link status can indicate that a write to the secure area 323 by the target device 200 was successful. At step S290, the client web application 320 closes the new browser window based on the link status. In one or more embodiments, the new browser window is closed such that a user may not discern that the new browser window was even displayed.

According to one or more example embodiments of inventive concepts disclosed herein, there are provided novel solutions for establishing a link to a secure area 323 so that target device 200 can access the user area 323. The client device 4 and the target device 200 are then allowed to read and/or write to and/or from the secure area 323 of the repository 322.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What I claim is:

1. A target device of a network for accessing a secure area of a remote repository comprising:
   a memory storing one or more computer-readable instructions; and
   a processor configured to execute the one or more computer-readable instructions to:
      receive a request from a client web application running in a web browser of a client device of the network to access a hypertext transfer protocol (HTTP) uniform resource locator (URL) link associated with the target device, wherein the HTTP URL link of the request includes an internet protocol (IP) address of the target device that encodes a token associated with the secure area as a query parameter;
      read the query parameter to obtain the token;
      store the token at the target device;
      create a link to the remote repository based on the token, wherein creating the link to the remote repository comprises: writing to the secure area based on the token; and
      receiving a notification from a server application directed to the client web application; and
      access the secure area based on the created link.

2. The target device of claim 1, wherein the processor is further configured to execute the one or more instructions to:
   send an HTTP response to the web browser of the client device based on the request.

3. The target device of claim 2, wherein the HTTP response comprises a web page.

4. The target device of claim 1, wherein the target device is an access point device.

5. The target device of claim 4, wherein creating the link to the remote repository comprises:
   providing the notification to the client web application, wherein the notification indicates to the client web application that the web page can be closed.

6. The target device of claim 1, wherein the token comprises a username and a password associated with the username.

7. A method for a target device to access a secure area of a remote repository, the method comprising:
   receiving a request from a client web application running in a web browser of a client device of the network to access a hypertext transfer protocol (HTTP) uniform resource locator (URL) link associated with the target device, wherein the HTTP URL link of the request includes an internet protocol (IP) address of the target device that encodes a token associated with the secure area as a query parameter;
   reading the query parameter to obtain the token;
   storing the token at the target device;
   creating a link to the remote repository based on the token, wherein creating the link to the remote repository comprises: writing to the secure area based on the token; and receiving a notification from a server application directed to the client web application; and
   accessing the secure area based on the created link.

8. The method of claim 2, further comprising:
   sending an HTTP response to the web browser of the client device based on the request.

9. The method of claim 8, wherein the HTTP response comprises a web page.

10. The method of claim 7, wherein the target device is an access point device.

11. The method of claim 10, wherein creating the link to the remote repository comprises:
    providing the notification to the client web application, wherein the notification indicates to the client web application that the web page can be closed.

12. The method of claim 7, wherein the token comprises a username and a password associated with the username.

13. A non-transitory computer-readable medium of a target device storing one or more instructions for accessing a secure area of a remote repository, which when executed by a processor of the target device, cause the target device to perform one or more operations comprising:
    receiving a request from a client web application running in a web browser of a client device of the network to access a hypertext transfer protocol (HTTP) uniform resource locator (URL) link associated with the target device, wherein the HTTP URL link of the request includes an internet protocol (IP) address of the target device that encodes a token associated with the secure area as a query parameter;
    reading the query parameter to obtain the token;
    storing the token at the target device;

creating a link to the remote repository based on the token, wherein creating the link to the remote repository comprises: writing to the secure area based on the token; and receiving a notification from a server application directed to the client web application; and accessing the secure area based on the created link.

14. The non-transitory computer-readable medium of claim 13, wherein the one or more instruction when executed by the processor further cause the target device to perform one or more further operations comprising:

sending an HTTP response to the web browser of the client device based on the request.

15. The non-transitory computer-readable medium of claim 14, wherein the HTTP response comprises a web page.

16. The non-transitory computer-readable medium of claim 13, wherein the target device is an access point device, and wherein creating the link to the remote repository comprises:

providing the notification to the client web application, wherein the notification indicates to the client web application that the web page can be closed.

17. The non-transitory computer-readable medium of claim 13, wherein the token comprises a username and a password associated with the username.

* * * * *